Sept. 9, 1969  C. E. EDWARDS  3,465,508
POWER TRANSMITTING MEANS
Filed March 24, 1967
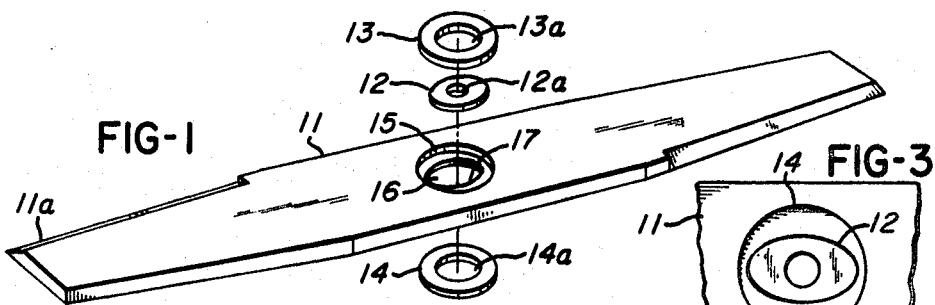
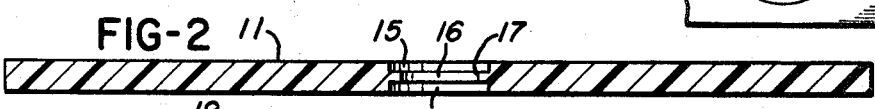
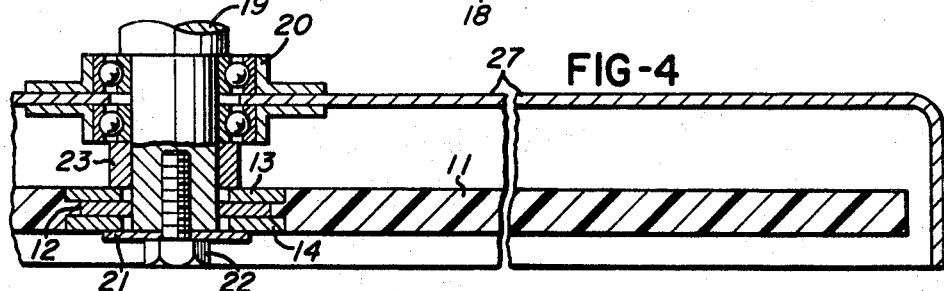
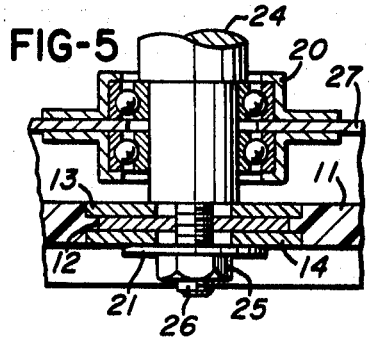
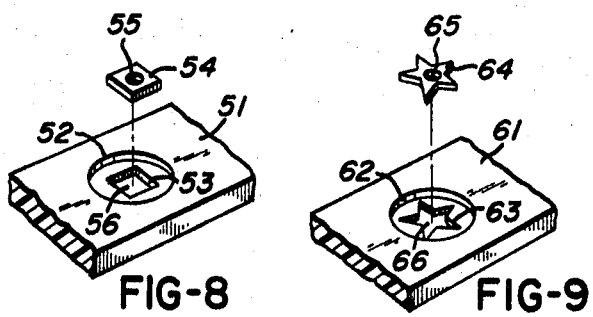
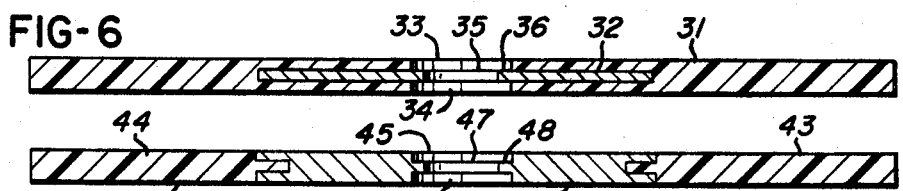
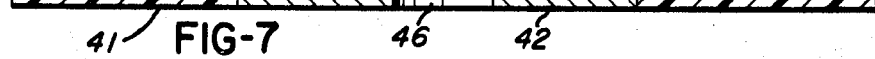
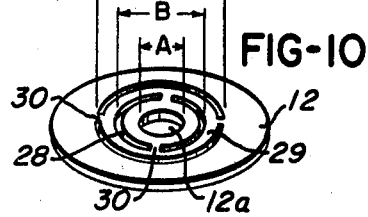
INVENTOR
CHARLES E. EDWARDS
BY Reuben Wolk
ATTORNEY United States Patent Office 3,465,508
Patented Sept. 9, 1969

3,465,508
POWER TRANSMITTING MEANS
Charles E. Edwards, Dayton, Ohio, assignor to Dayco Corporation, Dayton, Ohio, a corporation of Delaware
Filed Mar. 24, 1967, Ser. No. 625,737
Int. Cl. A01d 55/26
U.S. Cl. 56—295                                    2 Claims

ABSTRACT OF THE DISCLOSURE

A power transmitting means in the form of a universal adapter for lawnmower blades to transmit power from the drive shaft of a rotary lawnmower to the blade. The means consists of a sandwich of three washers; the central one is mounted within an aperture in the adapter or blade to transmit power laterally into the blade, while the outer washers transmit rotational power to the shaft to the central washer.

---

The invention relates to a power transmitting means for a lawnmower blade for use in rotary lawnmowers. The lawnmowers referred to are those in which the drive shaft extends downwardly through the lawnmower housing, usually at right angles to the motor upon which the blade is mounted, thus permitting a rotation of the blade parallel to the ground to cut the grass. Mowers of this type are in common use by homeowners and have application in industrial fields as well.

Lawnmower blades of the type described are generally formed of a flat elongated member having a cutting edge near each tip, and having a mounting hole in its center permitting the blade to be mounted on the drive shaft. Because of the vast number of lawnmower blade manufacturers, many variations have appeared in the design of the drive shaft, such as its diameter, length, relationship to the housing, method of attachment, etc. Consequently, the installation of a replacement blade frequently causes complications, and it has been found necessary for the manufacturers of the mowers or the blades to provide various types of adapters so that replacement may be made. These adapters are further complicated in that they must not only permit a size match and housing clearance to occur, but must also be capable of transmitting full power from the shaft to the blade. Applicant has found that a weird assortment of hardware of varying shapes and sizes has been utilized to eliminate the problems referred to above. The present invention provides a novel and simple means for mounting blades on the various types of mowers, while providing a full power drive. This is accomplished by designing the central mounting hole of the lawnmower blade with a shoulder so that in effect there is a central web which creates an aperture through which the mounting shaft or mounting bolt may be inserted, while above and below this web a space is created for the insertion of flush washers. This means also includes a central member which fits within the smallest hole created by the web and which itself has a small diameter mounting hole through which the shaft or mounting bolt may be inserted. By fitting the washers above and below this web and central member, vertical pressure is applied to create a driving continuity between the blade and the shaft or bolt, thus permitting a driving action to occur. At the same time the central driving members may be modified in order to provide the central aperture of the same diameter as the drive shaft in order to eliminate a sloppy fit. This invention also offers a method of installing replacement blades on all available lawnmowers, requiring only the hardware supplied with mowers, and eliminating the need to obtain additional washers, bolts, fasteners, shims, bushings, adapters, etc. This relationship is more fully brought out in the following description and drawings, illustrating preferred forms of the invention, as follows:

FIGURE 1 is an exploded perspective view of a typical lawnmower blade and the driving means.

FIGURE 2 is an elevational view in section further illustrating the blade of FIGURE 1.

FIGURE 3 is a top elevational view of a segment of the blade illustrating the insertion of the driving means.

FIGURE 4 is a side elevational view in partial section illustrating the blade and driving means mounted in a lawn mower housing.

FIGURE 5 is a view similar to FIGURE 4 illustrating another typical mounting arrangement.

FIGURES 6 and 7 are views similar to FIGURE 2 illustrating modified types of lawnmower blades.

FIGURES 8 and 9 are perspective views in partial section illustrating modified forms of the invention.

FIGURE 10 is a perspective view illustrating in detail the driving member having variation in hole diameter.

Referring now to FIGURES 1–3, a typical lawnmower blade 11 is formed of an elongated flat member having cutting edges 11a. While this blade is illustrated in FIGURE 2 as being formed of a rigid or flexible plastic material, it should be understood that this may also be made out of a flexible elastomeric material such as rubber or urethane, or of conventional metals. Blade 11 has a central aperture 16 that is elliptical in shape, the aperture being defined by the web 17 of the blade. Larger circular apertures 15 and 18 extend above and below this web. In order to mount the blade on a lawnmower it is necessary to assemble additional members in order to create a complete driving means, and these members include a central driving member 12 which is also elliptical in shape to fit within the aperture 16, and is of sufficient thickness to form smooth upper and lower surfaces which are contiguous with the upper and lower surfaces of the web 17. The driving member 12 has a central aperture 12a which is circular. Mounted above and below the web 17 and drive member 12 are circular washers 13 and 14 which also have central circular apertures 13a and 14a. These washers are of proper thickness so that when they are placed above and below the web they may be flush with the upper and lower surfaces of the blade 11 as best shown in FIGURE 4, provided the blade has a standard thickness of $3/16$ inch. However, my invention has the added advantage of being just as easily adaptable to a blade which is thicker or thinner than standard. Regardless of blade thickness, the members 12, 13 and 14 will always combine to achieve the standard thickness of $3/16$ inch at the mounting shaft, which is certain to fit any lawnmower with its presupplied hardware, and still maintain the proper relationship of the blade in the housing. FIGURE 3 illustrates the appearance of the driving member 12 when it is inserted within the aperture 16 prior to insertion of the washers 13 and 14.

In order to provide a tight fit with drive shafts of various diameters that are provided with lawnmowers, it is necessary to vary the diameter of the aperture 12a of the driving member 12. This may be accomplished by many means, one of which is shown in FIGURE 10. The driving member 12 may include circular washers 28 and 29 which are merely held into the common structure by means of tangs 30. When both washers are left in place, the central aperture 12a will remain as shown, and will have diameter A. However, if a larger diameter drive shaft is to be utilized, the washer 28 may be knocked out by means of a sharp blow of a hammer or other tool, changing the diameter of the aperture 12a to diameter B. If it is then desired to accommodate a still larger diameter drive shaft, washer 29 may be driven out to convert the aperture 12a to diameter C. It is understood that any number of these knock-out washers may be provided to accommodate the number of sizes to be found in lawnmowers. It should be understood that instead of the knock-out arrangement just described, the member 12 may be provided with only a single aperture 12a that has a diameter A equivalent to the smallest of the standard shafts. If any of the other diameters are required, the aperture 12a is simply drilled out to a larger size.

The entire assembly just described is mounted in a lawnmower by placing it over the drive shaft 19 mounted in bearings 20 so that the shaft 19 passes completely through the apertures 12a, 13a and 14a of the washers and the driving member. The assembly is retained by a thrust bearing 23 which is mounted between the washer 13 and the bearing 20, and is secured by means of a bolt 22 which passes through retaining washer 21 into a threaded central portion of the drive shaft. As now mounted the blade is free to rotate within the housing 27, with power being transmitted from the shaft 19 and the thrust bearing 23 by applying vertical force against the washers 13 and 14 and the mating flat surfaces of the driving member 12. This member 12 in turn imparts the rotary force of the shaft by contacting the sides of web 17, which constitute the entire portion of the blade defining aperture 16. It can thus be seen that regardless of the diameter of the drive shaft or the corresponding diameter of the central aperture 16 of the blade, it is possible to impart the rotary forces which are necessary. By means of the knock-out washers 28 and 29 or similar arrangement, the shaft will always have a tight fit against the internal surface of the driving member 12, as illustrated in FIGURE 4, thus avoiding a "sloppy" effect.

FIGURE 5 illustrates an alternative mounting arrangement of the lawnmower blade assembly in which a different type of drive shaft 24 may be utilized. This shaft 24 is also mounted on bearings 20 in the housing 27, but in this case there is no thrust bearing as the shaft itself is provided with a shoulder that acts as a retainer. The lower portion of the shaft has a threaded end 26 which is inserted through the aperture 12a of the driving member 12 as well as through washers 13 and 14, and the nut 25 and washer 21 are then utilized to retain the blade on the threaded portion of the shaft. Power transmission is provided as described above and it is again noted that a tight fit is achieved between the threaded portion 26 of the drive shaft and the aperture 12a of the driving member. This modification, when compared with FIGURE 4, illustrates the versatility of the present device in its use on different types of shafts, and the different diameters of various drive shafts.

In the principal modification illustrated in FIGURES 1 and 2, the lawnmower blade was indicated as being a homogeneous member. It is, however, possible to form this blade differently, one method being illustrated in FIGURE 6. In this case the blade 31 is again shown as being a plastic material, although it could be rubber, metal, or other material, but a separate central web 32 made of rigid metal, plastic, or other suitable material is inserted within the central portion of the blade surrounding the mounting hole. The web extends inwardly farther than the remaining portion of the blade in order to create an elliptical opening 35 similar to the opening 16 illustrated in the principal modification. Above and below the central web are the apertures 33 and 34 which are circular just as are the apertures 15 and 18 of the principal modification, this relationship creating a shoulder 36 which is quite similar to the web 17 of the principal modification. The form of the invention may have some advantages in that additional strength will be created through the use of a metal web 32 when compared with a plastic or elastomeric web of the principal form of the invention. It can be readily seen that this blade may be assembled exactly as the blade 11, since the same relationship exists with respect to the central mounting arrangement.

FIGURE 7 illustrates a further modification of the blade in which a blade 41 is composed of a central member 42, preferably made of metal, although it may be made of rigid plastic or similar materials, and two arms 43 and 44 which provide the main body of the lawnmower blade and contain the cutting edges. Once again the central mounting means includes an aperture 47 which is elliptical in shape just like the aperture 16, and apertures 45 and 46 above and below the central aperture which combine to create the web 28 that is similar to the web 17. This modification may have some advantages in that a larger area of the blade surrounding the mounting means is more rigid than the remaining portion of the blade in designs where a flexible elastomeric or plastic blade is desired. The mounting arrangement is identical to that described with respect to the previous modifications.

All the above forms of the invention have been described with respect to the use of elliptical driving member 12 and mating aperture 16, since it has been found that an elliptical shape lends itself well to the driving action which takes place between the driving member and the inner walls of the web 17. This shape is also desirable because of the simplicity of manufacture. However, it is entirely possible to accomplish the same purpose by the use of many other shapes of driving members, such as illustrated in FIGURE 8, in which a mower blade 51 contains a central aperture 56 that is square in cross section and a driving member 54 that fits within the aperture. As in the case of the driving member 12, member 54 has a central aperture 55 which may also be varied in diameter. By the use of an aperture 52 and a similar aperture below the web 53, an arrangement similar to that previously described is created. Thus, the only difference between this form of the invention and that described above lies in the shape of the driving member 54 and cooperating aperture 56.

Another example of a modified shape of a driving member is illustrated in FIGURE 9 in which a lawnmower blade 61 has a central aperture 66 and circular apertures 62 above and below to create the web 63. Driving member 64, it will be noted, is star-shaped to mate with the aperture 66, and has a central aperture 65 which may be varied as described above. Once again this form of the invention is similar to the others except that the star-shaped driving member 64 mates within aperture 66 to drive the blade through the web 63.

In addition to the elliptical, square and star-shaped driving means described, it is also contemplated that other simple shapes such as triangular, rectangular, etc., be utilized.

While certain modifications of the invention has been illustrated and described above, it is contemplated that other modifications are feasible without departing from the scope of the invention.

I claim:
1. In a lawnmower having a rotatable shaft, the combination of a cutting blade having a central web defining a mounting aperture therein, larger apertures in said blade adjacent said central web, and means for transmitting power from said shaft to said blade including a driving member contacting the entire portion of said blade defining said mounting aperture.

2. The combination of claim 1 including members mounted in said larger apertures adjacent said driving member.

References Cited

UNITED STATES PATENTS

| | | | |
|---|---|---|---|
| 1,686,069 | 10/1928 | Bucklen | 56—25.4 XR |
| 2,516,365 | 7/1950 | Carraher | 56—295 XR |
| 2,651,530 | 9/1953 | Blydenburgh | 56—295 XR |
| 2,822,657 | 2/1958 | Chaffee | 56—295 |
| 2,837,887 | 6/1958 | Hansen | 56—295 |

ANTONIO F. GUIDA, Primary Examiner